Nov. 7, 1961

J. E. STARR 3,008,109

STRAIN GAGE

Filed April 18, 1960

INVENTOR.
James E. Starr

BY William R. Glisson
ATTORNEY

United States Patent Office 3,008,109

Patented Nov. 7, 1961

3,008,109
STRAIN GAGE

James E. Starr, Rosemont, Pa., assignor to The Budd Company, Philadelphia, Pa., a corporation of Pennsylvania Filed Apr. 18, 1960, Ser. No. 23,087
3 Claims. (Cl. 338—2)

This invention relates to a metal strain gage, especially to a printed-etched rolled metal foil strain gage and has for an object the provision of improvements in this art.

One of the particular objects of the invention is to provide a metal strain gage provided with a plurality of connections at each end and at each side so as to furnish a wide variety of connections for electrical lead conductors for various wiring arrangements.

Another object is to provide a plurality of lead connection tabs from each end of a gage grid in such relation that the nominal gage resistance and strain sensitivity is the same for any pair of circuit connections which are made.

Another object is to provide such a gage made from a rolled metal foil sheet secured on an insulating backer with the pattern placed by the photographic resist method and the gage made by the etching or chem-mill process in which the grid pattern is made by etching completely through the sheet of foil.

The above and other objects and advantages of the invention will be apparent from the following description of an exemplary embodiment, reference being made to the accompanying drawings wherein.

Figure 1:
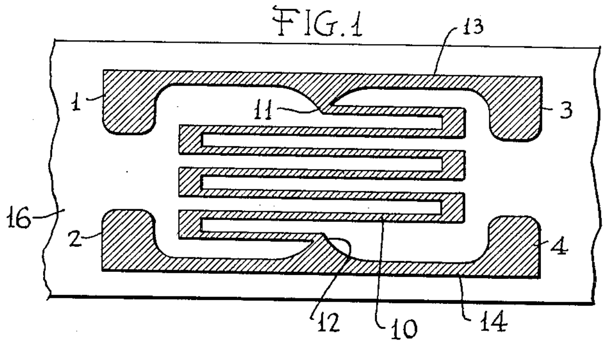
FIG. 1 is an enlarged plan view of a photo-printed through-etched rolled-sheet metal foil strain gage embodying the present invention.

The gage comprises a grid 10, lead bars 13 and 14 and lead tabs 1, 2, 3 and 4. The runs or strands of the grid consist of a plurality of long strands equal to the gage length and two short strands equal to half a gage length. The short strands having the long strands connected in series therebetween terminate the grid at terminals 11 and 12 located at the mid-point of the gage length. The ends of the grid join the middle of lead bars 13 and 14 at terminals 11 and 12. Lead bars 13 and 14 are parallel to the parallel strands of the grid (as shown) and extend beyond the gage length to assure that the grid will not be moved when lead connections are made to the lead tabs. The lead tabs are made much wider than the lead bars or the grid strands in order to facilitate making connections thereto. Lead tabs preferably are extended in width so as to wrap around and protect the grid, thus tab projections in width extend inward toward each other at a point beyond the gage length with gentle non-abrupt curves.

The gage pattern can be formed otherwise but is preferably made by securing a rolled metal foil sheet on an insulating backing sheet 16, as of plastic such as epoxy for example, and forming the pattern by a photographic resist printing and chemical mill or etching process which cuts completely through the sheet foil to form the spaces.

Figure 2:
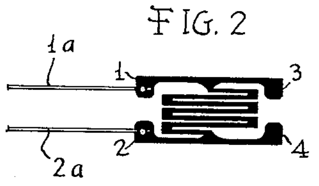
FIG. 2 is a plan view showing both leads connected to the tabs at one end.

In FIG. 2 the leads 1*a* and 2*a* are both soldered or welded to the lead tabs at one end.

Figure 3:
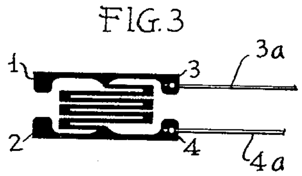
FIG. 3 is a view like FIG. 2 but showing the leads at the opposite end.

In FIG. 3 the leads 3*a* and 4*a* are both connected to the opposite end.

Figure 4:
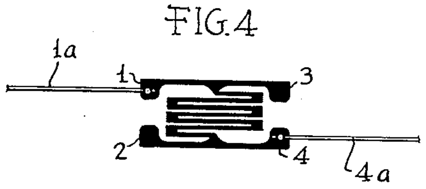
FIG. 4 shows one diagonal arrangement of lead connections.

In FIG. 4 the leads 1*a* and 4*a* are connected diagonally.

Figure 5:
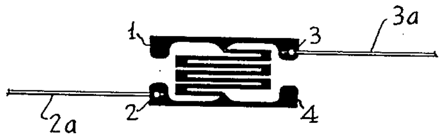
FIG. 5 is a view like FIG. 4 but showing the opposite diagonal arrangement.

In FIG. 5 the leads 2*a* and 3*a* are connected in an opposite diagonal manner.

The four different circuit connections are shown in FIGS. 2 to 5 and it will be seen that any one of the four different connections will include the resistance of one lead bar with tabs (two halves) and the same grid having its own characteristic strain sensitivity. The lead bars 13 and 14 are joined to the grid 10 at their mid-point by terminals 11 and 12 so that no matter which of the illustrated connection arrangements is made the nominal gage resistance and strain sensitivity will always be the same. In accord with standard strain gage practice the unit strain ($e$) for strain gages may be expressed as $$e \cong \frac{\Delta R}{R}$$

where R is the nominal gage resistance and ΔR is the change in gage resistance due to a particular load. This enables the gages to be put down in various locations without attention to which direction an end will face, so long as the grid itself is aligned with the strain directions, and the leads later attached as desired.

Figure 6:
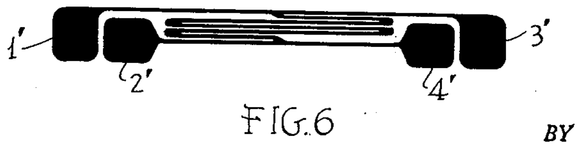
FIG. 6 shows a modified form.

FIG. 6 shows a modified form of narrow design in which the tab enlargements 1' and 3' on one side embrace the tab enlargements 2' and 4' of the other side.

While one embodiment of the invention has been described for purposes of illustration it is to be understood that there may be various embodiments and modifications within the scope of the invention.

What is claimed is:

1. A strain gage comprising a continuous grid pattern of parallel interconnected strands of uniform resistance material, said strands consisting of a plurality of long strands equal to the gage length and two short strands equal to half a gage length having the long strands connected in series therebetween, said short strands terminating at the mid-point of the gage length, and two oppositely extending lead bars parallel to said strands and of equal length and resistance, each being connected to a terminating short strand at the mid-point of the gage length to provide four lead bar connections to said grid, whereby any two of said bars having said grid connected in series therebetween define a strain gage of equal resistance and strain sensitivity.

2. A strain gage as set forth in claim 1, in which the grid is formed of foil material and in which all of said lead bars terminate in tabs which are much wider than said bars, said bars being tapered along at least one edge at the tab to provide connection tabs which protect said bars.

3. A strain gage as set forth in claim 2, in which said lead bars connected to one end of said grid are longer than the lead bars on the other end of said grid, said lead bars having tab side extensions at least as wide as the grid pattern to provide protection to said bars and said grid.

References Cited in the file of this patent

UNITED STATES PATENTS 2,913,691 Hines ---------------- Nov. 17, 1959